United States Patent
Fernández Lozano et al.

(10) Patent No.: US 12,091,316 B2
(45) Date of Patent: Sep. 17, 2024

(54) ANTIMICROBIAL COMPOSITE MATERIAL

(71) Applicants: CONSEJO SUPERIOR DE INVESTIGACIONES CIENTÍFICAS, Madrid (ES); ENCAPSULAE, S.L., Castellón (ES)

(72) Inventors: José Francisco Fernández Lozano, Madrid (ES); Julián Jimenez Reinosa, Madrid (ES); Alberto Moure Arroyo, Madrid (ES); José Javier Menéndez Medina, Castellón de la Plana (ES)

(73) Assignees: CONSEJO SUPERIOR DE INVESTIGACIONES CIENTÍFICAS, Madrid (ES); ENCAPSULAE, S.L., Castellón (ES)

( * ) Notice: Subject to any disclaimer, the term of this patent is extended or adjusted under 35 U.S.C. 154(b) by 843 days.

(21) Appl. No.: 15/734,264

(22) PCT Filed: Jun. 4, 2019

(86) PCT No.: PCT/ES2019/070378
§ 371 (c)(1),
(2) Date: Dec. 2, 2020

(87) PCT Pub. No.: WO2019/234276
PCT Pub. Date: Dec. 12, 2019

(65) Prior Publication Data
US 2021/0214223 A1 Jul. 15, 2021

(30) Foreign Application Priority Data
Jun. 5, 2018 (ES) ................. ES201830547

(51) Int. Cl.
| | |
|---|---|
| C01B 25/30 | (2006.01) |
| A01N 25/10 | (2006.01) |
| A01N 25/34 | (2006.01) |
| A01N 43/78 | (2006.01) |
| C08K 3/32 | (2006.01) |

(52) U.S. Cl.
CPC ............. *C01B 25/30* (2013.01); *A01N 25/10* (2013.01); *A01N 25/34* (2013.01); *A01N 43/78* (2013.01); *C08K 3/32* (2013.01)

(58) Field of Classification Search
None
See application file for complete search history.

(56) References Cited

U.S. PATENT DOCUMENTS 5,725,642 A * 3/1998 Kano ................ C09D 13/00
106/31.07
2013/0025764 A1 1/2013 Henderson

FOREIGN PATENT DOCUMENTS

| | | | | |
|---|---|---|---|---|
| CA | 2832418 A1 | * | 10/2012 | ............ A61K 33/00 |
| CN | 104542895 A | | 4/2014 | |
| CN | 104230394 | * | 12/2014 | |
| CN | 104961469 A | | 10/2015 | |
| WO | 2011129982 A2 | | 10/2011 | |
| WO | WO-2015091960 A1 | * | 6/2015 | ............ C03C 12/00 |

OTHER PUBLICATIONS

Kenawy et al., The Chemistry and Applications of Antimicrobial Polymers: A State-of-the-Art Review, Biomacromolecules, May 2007, 1359-1384, 8(5), American Chemical Society, Washington, D.C. (26 pages).
R. B. Tompkin, Indirect Antimicrobial Effects in Foods: Phosphates, Journal of Food Safety 6, 13-17, Jun. 14, 1983, Food & Nutrition Press, Inc., Westport, Connecticut. (15 pages).
Akhtar et al., Inhibitory effects of polyphosphates on Clostridium perfringens growth, sporulation and spore outgrowth, Food Microbiology, 802-808, Apr. 25, 2008, 25, Elsevier, Amsterdam. (7 pages).
ISO/TC 61/SC 6, ISO 22196:2011. Measurement of antibacterial activity on plastics and other nonporous surfaces, Aug. 2011, 2, ISO, Geneva. (1 page).
Obritsch, J. A. et al., Antibacterial Effects of Long-Chain Polyphosphates on Selected Spoilage and Pathogenic Bacteria, Journal of Food Protection, 1401-1405, Jan. 17, 2008, 71(7), International Association for Food Protection, Des Moines. (5 pages).
Olmos, D. et al. Preparation and Characterization of Antimicrobial Films Based on LDPE/Ag Nanoparticles with Potential Uses in Food and Health Industries, Nanomaterials, 1-16, Jan. 24, 2018, 8(60), MDPI, Basel, Switzerland. (16 pages).
Islam et al., Bioactive calcium phosphate-based glasses and ceramics and their biomedical applications: A review, Journal of Tissue Engineering, 1-16, Jun. 17, 2017, 8, SAGE, Thousand Oaks. (16 pages).
International Search Report in related PCT application PCT/ES2019/070378 filed Jun. 5, 2018, dated Sep. 20, 2019. (6 pages).

* cited by examiner

*Primary Examiner* — Melissa S Mercier
(74) *Attorney, Agent, or Firm* — Casimir Jones, SC; Tristan A. Fuierer

(57) ABSTRACT

The present invention relates to activated and ground sodium hexametaphosphate frit particles and antimicrobial composite material comprising said activated and ground sodium hexametaphosphate frit particles embedded in a thermoplastic polymer such as low density polyethylene (LDPE). The invention also relates to the method for obtaining the composite material of the invention and a thermal activation method for the thermal activation of a sodium hexametaphosphate salt in order to generate the activated and ground sodium hexametaphosphate frit particles. The antimicrobial material of the invention is preferably used in the food industry.

16 Claims, 8 Drawing Sheets

ANTIMICROBIAL COMPOSITE MATERIAL

CROSS-REFERENCE TO RELATED APPLICATIONS

This application is filed under the provisions of 35 U.S.C. § 371 and claims the priority of International Patent Application No. PCT/ES2019/070378 filed on 4 Jun. 2019 entitled "ANTIMICROBIAL COMPOSITE MATERIAL" in the name of José Francisco FERNÁNDEZ LOZANO, et al., which claims priority to Spanish Patent Application No. P201830547, filed on 5 Jun. 2018, both of which are hereby incorporated by reference herein in their entirety.

FIELD OF THE INVENTION

The present invention relates to the area of antimicrobial materials. More specifically, the present invention relates to the area of antimicrobial composite materials.

BACKGROUND OF THE INVENTION

Today, microbial infections still account for a quarter of deaths worldwide. This situation is aggravated if the increase in antibiotic resistance by microorganisms is taken into account. Many substances can be described as antimicrobial, for example disinfectants, antibiotics, and obviously antimicrobial agents. However, many of these compounds can be toxic or harmful to human beings.

The document by Kenawy et al. [E. Kenawy, S. D. Worley and R. Broughton. *The Chemistry and Applications of Antimicrobial Polymers: A State-of-the-Art Review. Biomacromolecules*, 85, 1359-1384 (2007)] proposes the use of polymers for improving the efficacy of some antimicrobial agents. In particular, Kenawy et al. propose the introduction of antimicrobial functional groups in polymer molecules, generating antimicrobial polymers. In this manner, the residual toxicity of said functional groups is reduced and their efficiency, selectivity, and shelf life are increased. However, attempts at reducing the toxicity of said antimicrobial agents are far from guaranteeing their use in areas as susceptible as food and medical applications, among others.

In the food industry, sodium hexametaphosphate is used as a synthetic stabilizer and an acidity regulator. It can be applied in meat and fish to improve their water retention capacity and to prevent fat oxidation. In emulsions, it increases viscosity and prevents product precipitation, improving the texture and color of the food products. For these reasons, it is often found in processed meat, chewing gums, sugary drinks, ready-made meals and dairy products, such as lactose-free milk or different types of cheese, sauce, fruit jellies, frozen desserts, salad dressing, breakfast cereal, ice-cream, beer, and bottled drinks, among others. For example, document CN104542895A describes a water-soluble polymer composite material for use as pork meat preservative. The composition of said polymer material includes a commercial sodium hexametaphosphate salt in a proportion between about 15-25% by weight to preserve the moisture in the meat. Furthermore, by means of adding specific natural bactericidal agents such as pomelo peel polysaccharides, a bactericidal effect is generated in the polymer material described in said document. The polymer material described in document CN104542895A is used as preservative, although it would be limited to specific applications and could not be used, for example, for food packaging, due to its water-soluble nature.

In the scientific literature, phosphate salts have been described as acting indirectly as preservatives or microorganism growth inhibitors. The document by Tompkin [R. B. Tompkin, *Indirect antimicrobial effects in foods: phosphates. Journal of Food Society* 6 (1983) 13-17] describes the inhibitory mechanism produced by said phosphate salts due to interferences with the divalent cation metabolism of the microorganisms by causing a deficiency, mainly of magnesium, which inhibits cell division and causes the loss of cell wall. The document by Akhtar et al. [S. Akhtar, D. Paredes-Sabja, M. R. Sarker. *Inhibitory effects of polyphosphates on Clostridium perfringens growth, sporulation and spore outgrowth. Food Microbiology* 25, 6(2008) 802-808] describes bacterial growth inhibition processes for a relevant number of bacteria for polyphosphate salt concentrations commonly used in the food industry, i.e., 0.2-0.8% by weight. However, the efficacy of said polyphosphate salts as antimicrobial agents described in the state of the art is extremely limited and does not allow the use thereof in a large number of bacteria. Another difficulty in the use of polyphosphate salts as antimicrobial agents is the slow dissolution thereof in aqueous media. Furthermore, a simultaneous antimicrobial effect of polyphosphate salts in Gram-positive and Gram-negative bacteria has not been proven so far.

There is therefore a need to provide new composite materials which exhibit antimicrobial activity against different bacteria, a high efficacy, and are free of the drawbacks related to toxicity phenomena.

BRIEF DESCRIPTION OF THE INVENTION

The authors of the present invention have developed a composite material comprising activated and ground sodium hexametaphosphate frit particles and a polymer matrix with antimicrobial properties.

Therefore, a first aspect of the invention relates to a composite material comprising:
  a) activated and ground sodium hexametaphosphate frit particles obtainable by means of a thermal activation method comprising the steps of:
    i) heating a sodium hexametaphosphate salt until it melts such that a molten sodium hexametaphosphate salt is obtained;
    ii) abruptly the molten sodium cooling hexametaphosphate salt obtained in step (i) in a dry medium to obtain activated sodium hexametaphosphate frit particles; and
    iii) grinding the activated sodium hexametaphosphate frit particles obtained in step (ii) to obtain activated and ground sodium hexametaphosphate frit particles; and
  b) a polymer matrix;
wherein said activated and ground sodium hexametaphosphate frit particles are embedded in said polymer matrix.

A second aspect of the present invention relates to the use of the composite material of the present invention as an antimicrobial agent; preferably as an antibacterial agent; more preferably as an antibacterial agent against Gram-positive bacteria and Gram-negative bacteria.

A third inventive aspect relates to a method for obtaining the composite material of the present invention, comprising the steps of
  i) providing
    a) activated and ground sodium hexametaphosphate frit particles obtainable by means of a thermal activation method comprising the steps of:

i) heating a sodium hexametaphosphate salt until it melts such that a molten sodium hexametaphosphate salt is obtained;
ii) abruptly cooling the molten sodium hexametaphosphate salt obtained in step (i) in a dry medium to obtain activated sodium hexametaphosphate frit particles; and
iii) grinding the activated sodium hexametaphosphate frit particles obtained in step (ii) to obtain activated and ground sodium hexametaphosphate frit particles; and
b) a polymer matrix; and
ii) embedding said activated and ground sodium hexametaphosphate frit particles in said polymer matrix.

An additional inventive aspect relates to activated and ground sodium hexametaphosphate frit particles obtainable by means of a thermal activation method comprising the steps of:
i) heating a sodium hexametaphosphate salt until it melts such that a molten sodium hexametaphosphate salt is obtained;
ii) abruptly cooling the molten sodium hexametaphosphate salt obtained in step (i) in a dry medium to obtain activated sodium hexametaphosphate frit particles; and
iii) grinding the activated sodium hexametaphosphate frit particles obtained in step (ii) to obtain activated and ground sodium hexametaphosphate frit particles.

Finally, the last inventive aspect of the present invention relates to a thermal activation method for the thermal activation of a sodium hexametaphosphate salt in order to generate the activated and ground sodium hexametaphosphate frit particles as defined above, comprising the steps of
i) heating a sodium hexametaphosphate salt until it melts such that a molten sodium hexametaphosphate salt is obtained;
ii) abruptly cooling the molten sodium hexametaphosphate salt obtained in step (i) in a dry medium to obtain activated sodium hexametaphosphate frit particles; and
iii) grinding the sodium hexametaphosphate frit particles obtained in step (ii) to obtain activated and ground sodium hexametaphosphate frit particles.

FIGURES

Figure 7:
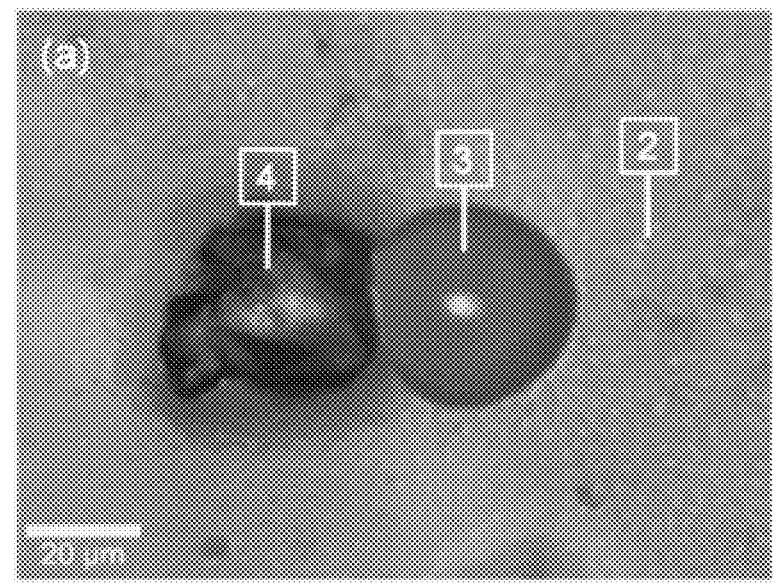
Figure 7:
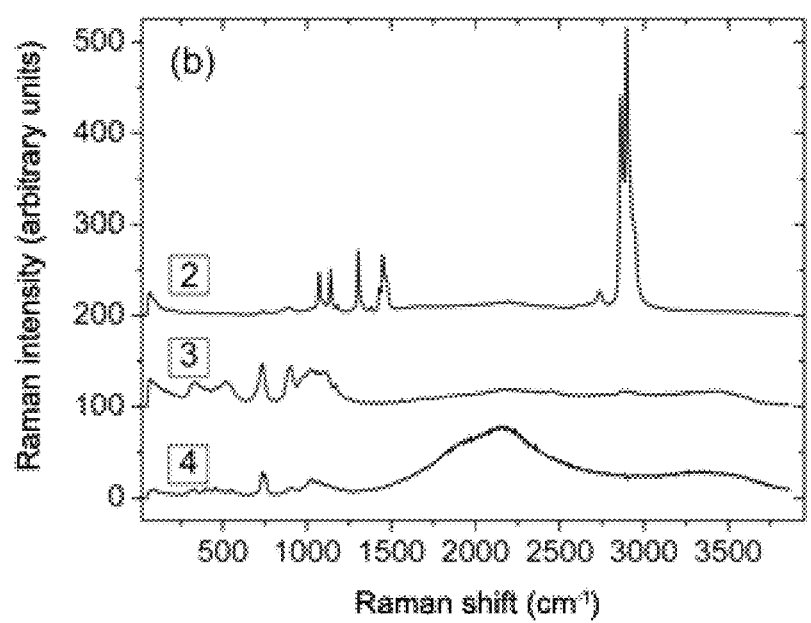

FIG. 7 shows (a) an optical confocal microscopy image of an activated and ground sodium hexametaphosphate frit particle (4) embedded in a low density polyethylene (2) together with a drop of water (3) after immersing the compound in water for 15 minutes and subsequently drying same at 60° C. for 1 hour. (b) representative Raman spectra corresponding to the image of the LDPE polymer matrix (2), a drop of water (3) stabilized on the surface of the compound in the proximity of an activated and ground sodium hexametaphosphate frit particle (4).

Figure 8:
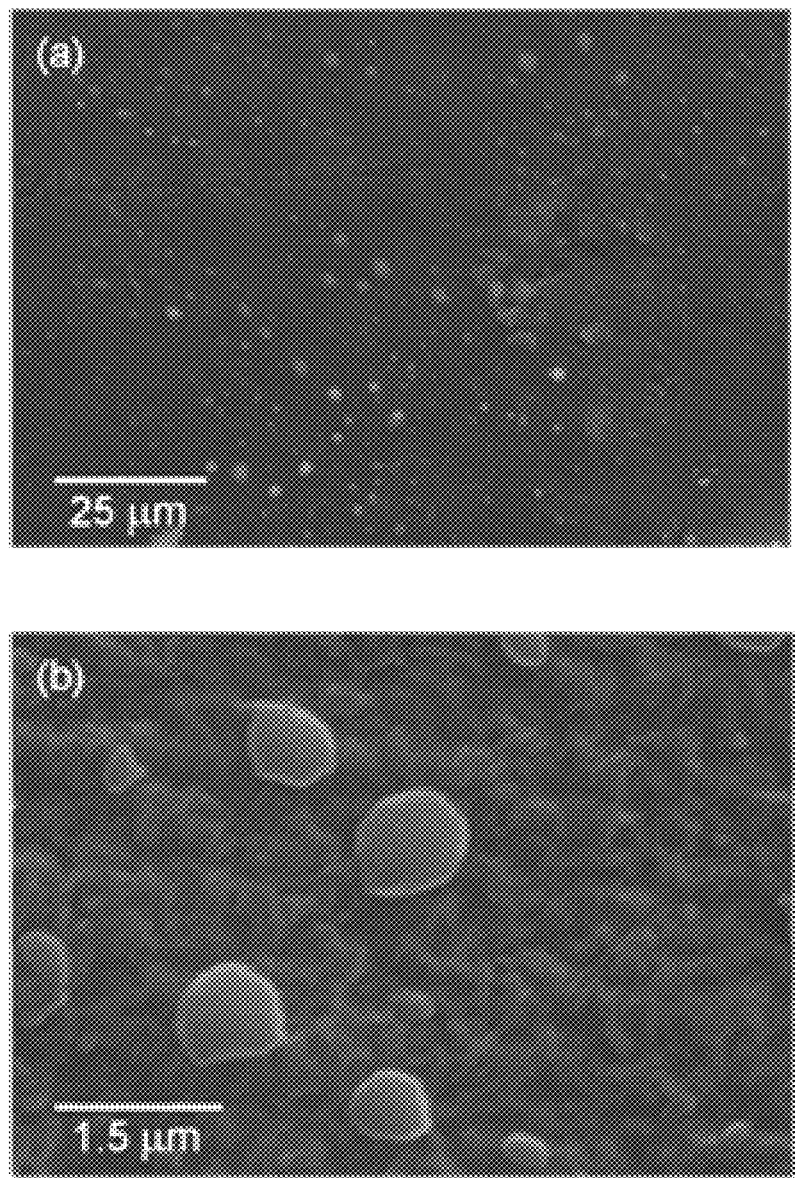

FIG. 8 shows micrographs at different magnifications (a) and (b) of the surface of the polymer film formed by the composite material comprising activated and ground sodium hexametaphosphate frit particles encapsulated in a polymer matrix according to Example 6. Said film was exposed to environmental humidity for 60 days and oven dried at 60° C. for 1 hour.

DETAILED DESCRIPTION OF THE INVENTION

Unless otherwise stated, all the scientific terms used herein have the meaning commonly understood by one skilled in the art for whom this description is intended. In the present invention, the singular forms include plural forms unless otherwise indicated.

Composite Material and Activated and Ground Sodium Hexametaphosphate Frit Particles The main aspect of the present invention is to provide a composite material comprising:
a) activated and ground sodium hexametaphosphate frit particles obtainable by means of a thermal activation method comprising the steps of:
i) heating a sodium hexametaphosphate salt until it melts such that a molten sodium hexametaphosphate salt is obtained;
ii) abruptly cooling the molten sodium hexametaphosphate salt obtained in step (i) in a dry medium to obtain activated sodium hexametaphosphate frit particles; and
iii) grinding the activated sodium hexametaphosphate frit particles obtained in step (ii) to obtain activated and ground sodium hexametaphosphate frit particles; and
b) a polymer matrix;
wherein said activated and ground sodium hexametaphosphate frit particles are embedded in said polymer matrix.

The term "composite material" refers to combinations of at least two types of materials to achieve the combination of properties which is impossible to obtain in the original materials. Generally, composite materials have a continuous matrix and a discrete load. The composite material of the present invention comprises a continuous matrix which is a polymeric matrix preferably hydrophobic or water-repellent, and a discrete load comprising activated and ground sodium hexametaphosphate frit particles obtainable by means of a thermal activation method as mentioned above.

The authors of the present invention have surprisingly found an antimicrobial behavior in the composite material of the present invention.

An inventive aspect of the present invention relates to activated and ground sodium hexametaphosphate frit particles obtainable by means of a thermal activation method comprising the steps of:

i) heating a sodium hexametaphosphate salt until it melts such that a molten sodium hexametaphosphate salt is obtained;
ii) abruptly cooling the molten sodium hexametaphosphate salt obtained in step (i) in a dry medium to obtain activated sodium hexametaphosphate frit particles; and
iii) grinding the activated sodium hexametaphosphate frit particles obtained in step (ii) to obtain activated and ground sodium hexametaphosphate frit particles.

In the present invention, the activated and ground sodium hexametaphosphate frit particles are obtainable by means of a thermal activation method comprising step (i) of heating a sodium hexametaphosphate salt until it melts such that a molten sodium hexametaphosphate salt is obtained.

In the context of the present invention, the expression "sodium hexametaphosphate" refers to a chemical compound formed by a mixture of linear polyphosphate polymers with general formula $(NaPO_3)_n$. Among other names, said chemical compound can also be called: "Graham's salt", Calgon S, glassy sodium, sodium tetraphosphate, sodium metaphosphate, sodium polymetaphosphate, sodium polyphosphate, hexasodium metaphosphate, hexasodium salt, metaphosphoric acid, and the like.

In the context of the present invention, the expression "sodium hexametaphosphate salt" refers to a sodium hexametaphosphate salt generated by heating sodium di-hydrogen phosphate ($NaH_2PO_4$), disodium di-hydrogen pyrophosphate ($Na_2H_2P_2O_7$) or $NaH(NH_4)PO_4 \cdot 4H_2O$, or other sodium salt or salts to their melting point, and then quenching it.

In the context of the present invention, the term "frit" refers to an inorganic compound having no long-range crystalline order or subcooled glass or liquid compound. Frit is in the form of irregular fragments, flakes, or granules obtained from melting a starting material, having the same chemical composition as the initial material, at high temperatures and a rapid quenching.

In the context of the present invention, the expression "activated and ground sodium hexametaphosphate frit particles" refers to particles obtainable from a sodium hexametaphosphate salt by means of a thermal activation method comprising the steps of:
i) heating a sodium hexametaphosphate salt until it melts such that a molten sodium hexametaphosphate salt is obtained;
ii) abruptly cooling the molten sodium hexametaphosphate salt obtained in step (i) in a dry medium to obtain activated sodium hexametaphosphate frit particles; and
iii) grinding the activated sodium hexametaphosphate frit particles obtained in step (ii) to obtain activated and ground sodium hexametaphosphate frit particles.

In the context of the present invention, the expression "thermal activation method" refers to a method not related to a chemical reaction, such as the synthesis of a material other than the precursor, rather it refers to a method related to the modification of the material characteristics and/or properties which are acquired through a process requiring a heat treatment as defined in the present invention and performed with the means known by one skilled in the art. In the present invention, said method further comprises a step of grinding which can be performed by means of methods known by one skilled in the art.

In the context of the present invention, the expression "heating a sodium hexametaphosphate salt until it melts" refer to a sufficient heating so that the sodium hexametaphosphate salt changes its physical state, going from solid state to liquid state by the action of heat. Said heating can be carried out using any of the means known by one skilled in the art, for example, by means of heating in an oven.

In a particular embodiment, step (i) of the method for the activation of the activated sodium hexametaphosphate frit particles of the present invention comprises heating said sodium hexametaphosphate salt of step (i) at a temperature between 630° C. and 1000° C., preferably between 650 and 900° C., more preferably between 660 and 800° C.

In a particular embodiment, step (i) of the method for the activation of the activated sodium hexametaphosphate frit particles of the present invention comprises heating said sodium hexametaphosphate salt of step (i) for at least 30 minutes, preferably for at least 1 hour, more preferably for a period of time comprised between 1 hour and 5 hours.

In a particular embodiment, step (i) of the method for the activation of the activated sodium hexametaphosphate frit particles of the present invention comprises heating for at least 30 minutes at a temperature between 650 and 900° C.

In the present invention, the activated and ground sodium hexametaphosphate frit particles are obtainable by means of a thermal activation method comprising step (ii) of abruptly cooling the molten sodium hexametaphosphate salt obtained in step (i)) in a dry medium to obtain activated sodium hexametaphosphate frit particles.

In a particular embodiment, step (ii) of the method for the activation of the activated sodium hexametaphosphate frit particles of the present invention comprises pouring said molten sodium hexametaphosphate salt obtained in step (i) on a metal plate, preferably on a bronze or stainless steel plate, preferably a bronze plate.

In a particular embodiment, step (ii) of the method for the activation of the activated sodium hexametaphosphate frit particles of the present invention comprises pouring said molten sodium hexametaphosphate salt obtained in step (i) on a fritting device; preferably a dry fritting device.

In the context of the present invention, the expression "dry fritting device" refers to fritting equipment of the types commonly known by one skilled in the art, preferably to a frit cooler-laminator to which a device for having a controlled and stable final frit particle temperature is applied.

In a particular embodiment, step (ii) of the method for the activation of the activated sodium hexametaphosphate frit particles of the present invention comprises pouring said molten sodium hexametaphosphate salt obtained in step (i) on a metal plate, wherein said metal plate is at a temperature between 15 and 50° C., preferably at room temperature.

In a particular embodiment, step (ii) of the method for the activation of the activated sodium hexametaphosphate frit particles of the present invention comprises pouring said molten sodium hexametaphosphate salt obtained in step (i) on a metal plate, wherein said metal plate is cooled by means of a water coil or by means of an air stream.

In the context of the present invention, the expression "room temperature" refers to a temperature comprised between 15 and 35° C.

In the context of the present invention, the expression "abruptly", in reference to the cooling of said molten sodium hexametaphosphate salt obtained in step (i), refers to a reduction of the temperature of molten sodium said hexametaphosphate salt from its melting temperature to a temperature below 500° C. in less than one minute, i.e., with a cooling speed greater than 200° C./min.

In a particular embodiment, step (ii) of the method for the activation of the activated sodium hexametaphosphate frit particles of the present invention comprises a cooling speed greater than 200° C./min, preferably greater than 300° C./min.

In the context of the present invention, the expression "in a dry medium", in reference to the cooling of said molten sodium hexametaphosphate salt obtained in step (i), refers to rapidly cooling said molten salt without the aid of a liquid medium, such as for example water, using means commonly known by one skilled in the art.

Additionally, the authors of the present invention have surprisingly found that the thermally activated sodium hexametaphosphate frit particles of the present invention have a higher dissolution capacity and rate of dissolution than the sodium hexametaphosphate salt.

Without being bound to a particular theory, the authors of the present invention have found that, when using cooling in a dry medium, costs are saved in the conditioning of the frit particles of the present invention associated with the formation of bonds between said particles during drying. Furthermore, an increase in yield expressed as kilograms of frit produced per hour has been observed by means of dry cooling.

In a particular embodiment, the activated sodium hexametaphosphate frit particles are formed by a glass material.

In a more particular embodiment, the activated and ground sodium hexametaphosphate frit particles are formed by a glass material.

In the context of the present invention, the expression "glass material" refers to an inorganic material having an atom arrangement showing no long-range ordered structure unlike in the crystalline state.

In a particular embodiment, the activated and ground sodium hexametaphosphate frit particles have a Raman spectrum with a red shift in a manner corresponding to the symmetric stretching of the terminal oxygen atoms in the $PO_2$ units formed by Q2-type tetrahedral chains as the sodium hexametaphosphate salt.

In a particular embodiment, the activated and ground sodium hexametaphosphate frit particles comprise a mass percentage of absorbed water in the composition thereof greater than 2.5%, preferably greater than 5%, more preferably greater than 10%.

In a particular embodiment, the activated sodium hexametaphosphate frit particles are hydrophilic.

In a more particular embodiment, the activated and ground sodium hexametaphosphate frit particles are hydrophilic.

In particular embodiment, the activated sodium a hexametaphosphate frit particles a have higher rate of dissolution than the sodium hexametaphosphate salt.

In a more particular embodiment, the activated and ground sodium hexametaphosphate frit particles have a higher rate of dissolution than the sodium hexametaphosphate salt.

In a particular embodiment, the activated sodium hexametaphosphate frit particles are in an irregular form, preferably in the form of a granule or flake, more preferably a flake.

In a more particular embodiment, the activated and ground sodium hexametaphosphate frit particles are in an irregular form, preferably in the form of a granule or flake, more preferably a flake.

In a particular embodiment, the activated and ground sodium hexametaphosphate frit particles are transparent.

In a particular embodiment, the activated and ground sodium hexametaphosphate frit particles have a refractive index value comprised between 1.3 and 1.7, preferably between 1.4 and 1.6.

In the context of the present invention, the expression "particle size", in reference to the activated sodium hexametaphosphate frit particles of step (ii) or to the activated and ground sodium hexametaphosphate frit particles of step (iii), refers to the particle size distribution or granulometric curve which is statistically determined and characterized by d50 and d90 parameters. In the context of the present invention, the expressions "d50 parameter" and "d90 parameter" refer to the equivalent size corresponding to 50% and of 90%, respectively, the cumulative particle size distribution or granulometric curve. The equivalent size refers to the diameter of the sphere having the same specific area as the specified particle population.

In a particular embodiment, the activated sodium hexametaphosphate frit particles of the present invention have a d90 parameter below 5 cm, preferably below 2 cm, more preferably below 1 cm.

In a particular embodiment, the activated and ground sodium hexametaphosphate frit particles of the present invention have a d90 parameter below 100 micron, preferably below 50 micron, more preferably below 20 micron, even more preferably below 10 micron.

In a particular embodiment, the activated and ground sodium hexametaphosphate frit particles of the present invention are micrometric particles, preferably with an average diameter between 0.5 and 100 micron, more preferably between 1 and 50 micron, even more preferably between 1 and 10 micron.

In a preferred embodiment, the activated sodium hexametaphosphate frit particles of the present invention have less than 50% of the particles thereof with at least one of their dimensions below 100 nm.

In the present invention, the activated and ground sodium hexametaphosphate frit particles are obtainable by means of a thermal activation method comprising step (iii) of grinding the activated sodium hexametaphosphate frit particles obtained in step (ii) to obtain and ground activated sodium hexametaphosphate frit particles.

In the context of the present invention, the expression "activated and ground sodium hexametaphosphate frit particles" refers to activated sodium hexametaphosphate frit particles which have been subjected to a grinding and/or crushing method or a combination of grinding or crushing processes to select a specific range of sizes. Said grinding and/or crushing method can be selected from any of those known by one skilled in the art. Non-limiting examples of said grinding processes are those performed by means of mills, such as by means of planetary mills or jaw crushers, for example. Non-limiting examples of mills suitable for grinding of the present invention are ring mills such as tungsten carbide ring mills, jet mills, or ball or microball mills, among others.

In a particular embodiment, the grinding of step (iii) comprises at least a dry grinding in a planetary mill, preferably at least a dry grinding, preferably a dry grinding in a planetary mill, more preferably in a planetary mill with alumina or zirconium balls.

In a particular embodiment, the grinding of step (iii) comprises at least a dry grinding, preferably a dry grinding in a jaw crusher, preferably at least a dry grinding in a jaw crusher with tungsten rings.

In a particular embodiment, the grinding of step (iii) comprises at least a dry grinding, wherein said dry grinding comprises several steps of milling.

In a particular embodiment, the activated and ground sodium hexametaphosphate frit particles are a white or transparent powdery material, preferably transparent.

In the context of the present invention, the parameters defining the size distribution of the activated sodium hexametaphosphate frit particles or the activated and ground sodium hexametaphosphate frit particles can be measured by means of the methods known to one skilled in the art, for example, by means of a dry method using a particle size distribution laser analyzer such as a MASTERSIZER 2000 from MALVERN. The d90 parameter is statistically determined based on the equivalent size corresponding to 90% by weight of the population of the cumulative distribution of the particle size distribution or granulometric curve. In turn, the d50 parameter is statistically determined based on the equivalent size corresponding to 50% by weight of the population of the cumulative distribution of the particle size distribution or granulometric curve. In turn, in the context of the present invention, "equivalent size" refers to the diameter of the sphere having the same specific area as the specified particle population.

In the context of the present invention, the term "embed", in relation to the activated and ground sodium hexametaphosphate frit particles, refers to the introduction or incorporation of said particles in a polymer matrix by means of processes of the polymer industry known by one skilled in the art. In the context of the present invention, the term "embedded" or "embedded", in relation to the activated and ground sodium hexametaphosphate frit particles, refers to the fact that said particles can be found dispersed or agglomerated or aggregated, completely surrounded by the polymer matrix.

Without being bound to a particular theory, the authors of the present invention have observed that, when the size of the activated and ground sodium hexametaphosphate frit particles is reduced below d90 corresponding to 50 micron, preferably below 20 micron, and particularly preferably below 10 micron, and since these particles are embedded in a polymer matrix, their dispersion in the composite material improves and the flow lines in the composite material are reduced.

In a particular embodiment, the composite material of the present invention comprises a polymer matrix, wherein the polymer matrix comprises at least one thermosetting polymer, at least one thermoplastic polymer, at least one elastomer polymer, or combinations thereof; preferably at least one thermosetting polymer, at least one thermoplastic polymer, or combinations thereof; more preferably at least one thermoplastic polymer; even more preferably thermoplastic polymer; still preferably a hydrophobic thermoplastic polymer.

In the context of the present invention, the expression "thermoplastic polymer" refers to a polymer material which becomes deformable or flexible at relatively high temperatures, melts when heated, and hardens in a glass transition state when sufficiently cooled; preferably hydrophobic or water-repellent.

In a particular embodiment, the composite material of the present invention comprises a polymer matrix, wherein said polymer matrix comprises at least one thermoplastic polymer; preferably at least one thermoplastic polymer selected from polyether ether ketone, polyethylene terephthalate (PET), polyethylene (PE), high density polyethylene (HDPE), low density polyethylene (LDPE), polyvinyl chloride (PVC), polypropylene (PP), polystyrene (PS); polyvinylidene fluoride, poly(methyl methacrylate), polytetrafluoroethylene (PTFE), cellulosic polymers and derivatives, polyamide (PA), acrylonitrile butadiene styrene, polycarbonates; polyacetals, fluoroplastics, and combinations thereof.

In a preferred embodiment, the composite material of the present invention comprises a polymer matrix selected from polyethylene terephthalate (PET), high density polyethylene (HDPE), polyvinyl chloride (PVC), low density polyethylene (LDPE), polypropylene (PP), polystyrene (PS), poly (methyl methacrylate), polytetrafluoroethylene, polyamide (PA), ABS resin, cellulose derivatives such as cellophane, polycarbonates, polyacetals, and fluoroplastics.

In a more preferred embodiment, the composite material of the present invention comprises a low density polyethylene (LDPE) or polypropylene (PP) polymer matrix.

In a particular embodiment, the composite material of the present invention comprises a polymer matrix, wherein the polymer matrix comprises at least one thermosetting polymer; preferably at least one thermosetting polymer selected from Hexcel 8852, RTM6, nitrile, silicone, polyamide, vinyl ester, polyester, polyurethane, formaldehyde, amino urea, epoxy or phenolic resins.

In the context of the present invention, the expression "thermosetting polymer" refers to an infusible and insoluble polymer material, preferably hydrophobic or water-repellent.

In a particular embodiment, the composite material of the present invention comprises a polymer matrix, wherein the polymer matrix comprises at least one elastomer polymer, preferably at least one elastomer polymer selected from natural rubber, polyisoprene, polychloroprene, polybutadiene, styrene-butadiene rubber, acrylonitrile-butadiene rubber, polychloroprene, neoprene, polyester, polysulfite, polyurethane, and silicone.

In a particular embodiment, the composite material of the present invention comprises a polymer matrix with a refractive index value comprised between 1.3 and 1.7, preferably between 1.4 and 1.6.

In a particular embodiment, the composite material of the present invention comprises a hydrophobic or water-repellent polymer matrix, preferably hydrophobic.

In a more preferred embodiment, the composite material of the present invention comprises a polymer matrix consisting of a hydrophobic or water-repellent polymer, preferably hydrophobic.

In the context of the present invention, the expression "hydrophobic surface" refers to a surface of a material that repels water.

In the context of the present invention, the terms "hydrophobic" and "hydrophilic" are antonyms and refer to the tendency of a material to interact with water. In the context of the present invention, the term "hydrophobic" refers to a material or substance that repels water or with a low affinity for water and will be used in the sense of repelling water. In the context of the present invention, the term "hydrophilic" refers to a material with affinity for water.

In a more preferred embodiment, the composite material of the present invention can be formed by means of one or several conventional forming methods in the plastic industry such as in conventional thermoplastic or thermosetting material forming processes, for example. Non-limiting examples of forming processes are extrusion, pressure molding, blow molding, rotational molding, calendering, vacuum molding, and the like.

In a particular embodiment, the composite material of the present invention comprises activated and ground sodium hexametaphosphate frit particles in a mass percentage less than 60%, preferably less than 40%, more preferably between 0.1% and 40%, even more preferably between 0.5 and 30%.

In a particular embodiment, the composite material of the present invention comprises activated and ground sodium hexametaphosphate frit particles in a mass percentage less than 6%, preferably between 0.1% and 5%, more preferably between 0.5 and 2.5% by mass.

The composite material of the present invention comprises activated and ground sodium hexametaphosphate frit particles, wherein said particles are embedded in said polymer matrix.

In a particular embodiment, the composite material of the present invention retains water; preferably it retains water; more preferably it retains water in a humid environment.

In a particular embodiment, the composite material of the present invention comprises hydrophobic and hydrophilic areas on the surface thereof.

The authors of the present invention have observed that the composite material of the present invention has antimicrobial properties.

In a preferred embodiment, the composite material of the present invention has antibacterial properties.

In a preferred embodiment, the composite material of the present invention exhibits an antimicrobial response, preferably an antibacterial response, more preferably an antibacterial response against Gram-positive and Gram-negative bacteria, even more preferably against *Staphylococcus aureus, Listeria innocua*, and *Escherichia coli*.

In a preferred embodiment, the composite material of the present invention exhibits an antimicrobial response, preferably an antibacterial response, more preferably an antibacterial response comprising bacterial population reduction (R) values greater than 2, preferably greater than 3.

In a preferred embodiment, the composite material of the present invention exhibits an antimicrobial response in a humid environment, preferably an antibacterial response in a humid environment.

In a preferred embodiment, the composite material of the present invention exhibits an antibacterial response comprising bacterial population reduction (R) values greater than 2 for a time above 24 hours, preferably greater than 3 for a time above 24 hours.

In a preferred embodiment, the composite material of the present invention exhibits an antibacterial response comprising bacterial population reduction (R) values greater than 2 for a time above 1 month, preferably bacterial population reduction (R) values greater than 3 for a time above 1 month.

In the context of the present invention, the expression "bacterial population reduction (R) value" is expressed by means of the following formula:

$$R = Ut - At$$

where:
R: bacterial population reduction (R) or bacterial activity reduction or log reduction;
Ut: log mean of the count of bacteria in control samples (without antimicrobial treatment) after 24 h of incubation; and
At: log mean of the count of bacteria in the samples with antimicrobial treatment after 24 h of incubation.

Therefore, in the context of the present invention the number expressed as bacterial population reduction (R) is the log-based capacity for eliminating bacteria which are in contact with the surface within a time of 24 hours. The higher the factor R is, the greater the capacity of the treated material for eliminating the test microorganisms.

In a particular embodiment, the composite material of the present invention prevents the formation of bacterial biofilms or organized microbial ecosystems; it preferably comprises surfaces preventing the formation of bacterial biofilms or organized microbial ecosystems.

In a particular embodiment, the composite material of the present invention is an anti-fouling material.

In a particular embodiment, the composite material of the present invention comprises surfaces functionalized preferably with polyethylene glycol (PEG) or oligoethylene glycol.

Without being bound to a particular theory, the authors of the present invention have observed that, when the activated and ground sodium hexametaphosphate frit particles of the present invention are embedded in a polymer matrix in order to generate a composite material, a composite material with antimicrobial properties is surprisingly obtained. Furthermore, it has been observed that said antimicrobial properties are maintained for a long time and work on different types of bacteria. Anti-fouling surface characteristics have also been surprisingly observed.

In a particular embodiment, the composite material of the present invention is in the form of a sheet or film, preferably in the form of a translucent sheet or film, more preferably in the form of a colorless and translucent sheet of film.

In a particular embodiment, the composite material of the present invention is in the form of a film with a thickness between 1 and 1000 micron, preferably between 10 and 500 micron, more preferably between 20 and 200 micron.

In a particular embodiment, the composite material of the present invention is in the form of a film with a smooth surface, preferably with a roughness below 2 µm, more preferably below 1 µm.

In a particular embodiment, the composite material of the present invention is in the form of a pellet.

In the context of the present invention, the term "pellet" refers to a solid granulated form which the composite material of the present invention may adopt for improved handling and transport. Non-limiting examples of pellet are granule-type amorphous agglomerates, crystalline agglomerates (spherulites), small macaroni-like cylinders, or glass-like beads.

In a particular embodiment, the composite material of the present invention has a low toxicity.

In a particular embodiment, the composite material of the present invention is not toxic.

In the context of t invention, the term "toxicity" refers to a substance which can cause adverse effects on a living organism when it comes into contact therewith.

In a particular embodiment, the composite material of the present invention comprises activated and ground sodium hexametaphosphate frit particles which can be dispersed or agglomerated in the polymer matrix.

In a particular embodiment, the composite material of the present invention comprises activated and ground sodium hexametaphosphate frit particles dispersed in the matrix.

In a particular embodiment, the composite material of the invention comprises activated and ground sodium present hexametaphosphate frit particles uniformly dispersed in the matrix.

Without being bound to a particular theory, the authors of the present invention have observed that the antimicrobial properties of the antimicrobial composite material are not affected by the state of the activated and ground sodium hexametaphosphate frit particles embedded, either by being dispersed or agglomerated, in the polymer matrix.

The composite material of the present invention comprises activated and ground sodium hexametaphosphate frit particles embedded in said polymer matrix.

In a particular embodiment, the composite material of the present invention increases the dissolution time of the activated and ground sodium hexametaphosphate frit particles.

In a particular embodiment, the composite material of the present invention comprises normalized conductivity values of less than 0.7 mS·cm$^{-1}$·g·ml$^{-1}$ per gram of activated and ground sodium hexametaphosphate frit particles and per milliliter of water after 15 minutes in an aqueous solution.

Furthermore, without being bound to a particular theory, the authors of the present invention have observed that the activated and ground sodium hexametaphosphate frit particles embedded in the polymer matrix have a conductivity value per gram in an aqueous solution that is less than the same particles not embedded in the polymer matrix.

In a particular embodiment, the composite material of the present invention further comprises at least one antimicrobial additive, antibiotic, antifungal, antiparasitics, antiviral, or antiseptic, preferably an antimicrobial additive.

In a particular embodiment, the composite material of the present invention further comprises at least one antimicrobial additive, preferably at least one antimicrobial additive selected from silver derivatives, copper derivatives, zinc derivatives, phenolic biocides, quaternary ammonium compounds, titanium oxides, fungicides such as tiabendazole, antimicrobial glass, and combinations thereof.

In the context of the present invention, the term "antimicrobial" refers to substances exhibiting the capacity to eliminate, inhibit the growth of, or reduce the presence of microorganisms such as bacteria, fungi, or parasites, and comprises antibiotic, antifungal, antiparasitic, antiviral, or antiseptic substances.

In a particular embodiment, the composite material of the present invention comprises silver derivatives, preferably positive silver ions (Ag$^+$).

In a particular embodiment, the composite material of the present invention further comprises at least one additive selected from plasticizers, stabilizers, lubricants, extenders, wetting agents, pore forming agents, impact modifiers, flame retardants, foaming agents, fillers, pigments, dyes, antistatic agents, adhesion promoters, fortifiers, anti-wear agents, and combinations thereof.

In a particular embodiment, the composite material of the present invention comprises at least one additional layer comprising a material other than that of the composite material of the present invention.

In a particular embodiment, the composite material of the present invention comprises organic functional groups, preferably organic functional groups with antibacterial properties.

Uses

An additional aspect of the present invention relates to the use of the composite material of the present invention as an antimicrobial agent, preferably as an antibacterial agent, more preferably as an antibacterial agent against Gram-positive bacteria and Gram-negative bacteria.

In a particular embodiment, the use of the composite material of the present invention is in the cosmetic, medical, and food industry, particularly in the food industry.

In a more particular embodiment, the composite material of the present invention is used as a protective film in the food industry, preferably as an antibacterial contact film.

In a particular embodiment, the composite material of the present invention is used in the industrial sector, in construction, in the packaging industry, in agriculture, and in consumer industries.

In a particular embodiment, the composite material of the present invention is used in the form of containers, food packaging, bags and packaging, greenhouse plastics, raffia, irrigation pipes, films, cutlery, furnishings, electrical appliances, personal hygiene and personal care products.

Method for Obtaining the Composite Material

One inventive aspect relates to a method for obtaining the composite material as defined above, comprising the steps of:

i) providing a) activated and ground sodium hexametaphosphate frit particles obtainable by means of a thermal activation method comprising the steps of:

i) heating a sodium hexametaphosphate salt until it melts such that a molten sodium hexametaphosphate salt is obtained;

ii) abruptly cooling the molten sodium hexametaphosphate salt obtained in step (i) in a dry medium to obtain activated sodium hexametaphosphate frit particles; and iii) grinding the activated sodium hexametaphosphate frit particles obtained in step (ii) to obtain activated and ground sodium hexametaphosphate frit particles; and b) a polymer matrix; and ii) embedding said activated and ground sodium hexametaphosphate frit particles in said polymer matrix.

In a particular embodiment, step (ii) of the method for obtaining the composite material of the present invention comprises embedding said activated and ground sodium hexametaphosphate frit particles in said polymer matrix, wherein said activated and ground sodium hexametaphosphate frit particles are completely covered by the polymer matrix.

In a particular embodiment, step (ii) of the method for obtaining the composite material of the present invention comprises incorporating the activated and ground sodium hexametaphosphate frit particles in said polymer matrix by means of processes known by one skilled in the art, preferably mixing, melting, and extrusion processes.

Thermal Activation Method

Finally, a last inventive aspect of the present invention relates to a thermal activation method for the thermal activation of a sodium hexametaphosphate salt in order to generate the activated and ground sodium hexametaphosphate frit particles as defined above, comprising the steps of i) heating a sodium hexametaphosphate salt until it melts such that a molten sodium hexametaphosphate salt is obtained;

ii) abruptly cooling the molten sodium hexametaphosphate salt obtained in step (i) in a dry medium to obtain activated sodium hexametaphosphate frit particles; and iii) grinding the activated sodium hexametaphosphate frit particles obtained in step (ii) to obtain activated and ground sodium hexametaphosphate frit particles.

The composite material, the method for obtaining said composite material, and the activation method for the activation of a sodium hexametaphosphate salt in order to generate the activated and ground sodium hexametaphosphate frit particles of the present invention comprises all the features described for the activated and ground sodium hexametaphosphate frit particles of the present invention in any of the particular embodiments thereof.

Furthermore, the method for obtaining the composite material of the present invention comprises all the features described for the composite material of the present invention in any of the particular embodiments thereof.

EXAMPLES

The invention is described below by means of the following examples which must be considered as merely illustrative and in no way limiting the scope of the present invention.

Example 1: Obtaining Activated Sodium Hexametaphosphate Frit Particles

Activated sodium hexametaphosphate frit particles were obtained as follows. 200 grams of sodium hexametaphosphate salt with chemical formula $(NaPO_3)_6$ were heated in a 600 ml alumina crucible at 10° C./min to a temperature of 800° C. and this temperature was maintained for 1 hour. Then, the molten sodium hexametaphosphate salt was poured on a bronze plate that was at a room temperature. Said molten salt was therefore cooled abruptly, reaching a temperature<300° C. in a time less than 1 minute, forming irregular fragments in the form of transparent flakes or granules, i.e., activated sodium hexametaphosphate frit particles.

Example 2: Obtaining Activated and Ground Sodium Hexametaphosphate Frit Particles Activated sodium hexametaphosphate frit particles were obtained according to Example 1 and they were then ground to different sizes according to two grinding processes I and II as described below. The particle sizes were determined from the d50 and d90 parameters (also referred to as mass median diameters) of the particles which were determined by means of a dry method using a particle size distribution laser analyzer MASTERSIZER 2000 from MALVERN. The particle size distribution or granulometric curve was statistically determined and characterized by means of the d50 and d90 parameters defined as the equivalent size corresponding to 50% and 90% by weight, respectively, of the population of the cumulative distribution. Equivalent size refers to the diameter of the sphere having the same specific area as the specified particle population.

Grinding Method I

The transparent irregular fragments obtained in Example 1 were ground by hand to obtain activated sodium hexametaphosphate frit with a size smaller than 1 cm.

The sodium hexametaphosphate frit was dry ground in a 1000 ml, porcelain, laboratory planetary mill with alumina balls of 14-20 mm for 30 minutes, generating an activated and ground sodium hexametaphosphate frit with a particle size distribution characterized by the d50 and d90 parameters of 16.8 and 80.5 µm, respectively. A second dry grinding step using 425 grams of yttrium-stabilized zirconium microballs having sizes comprised between 0.6 and 1.5 mm in a 400 ml laboratory planetary mill and 100 grams of previously ground sodium hexametaphosphate frit for 30 minutes produced particle sizes with the d50 and d90 parameters of 11.3 and 52.85 µm, respectively. An equivalent additional grinding with yttrium-stabilized zirconium microballs having sizes comprised between 0.3 and 0.6 mm produced an activated and ground sodium hexametaphosphate frit with an average d50 and d90 size of 8.5 and 44.3 µm, said frit was then characterized in Examples 3-5.

Grinding Method II

Alternatively, the activated sodium hexametaphosphate frit particles according to Example 1 were ground by means of an alternative grinding method as follows. The transparent irregular fragments obtained in Example 1 are fractionated using a tungsten carbide jaw crusher to obtain fragments with size smaller than 200 µm. Said fragments are ground in a tungsten carbide ring mill for 1 minute. The grinding resulted in activated and ground sodium hexametaphosphate frit particles with a particle size characterized by a d50 of 4.2 µm and a d90 of 8.3 µm, said particles were then characterized in Examples 3-6.

Comparative Example 3: Structure of the Activated and Ground Sodium Hexametaphosphate Frit Particles and the Sodium Hexametaphosphate Salt For comparison purposes, the structure of the activated and ground sodium hexametaphosphate frit particles of Example 2 and the sodium hexametaphosphate salt also ground in the same manner was evaluated.

Figure 1:
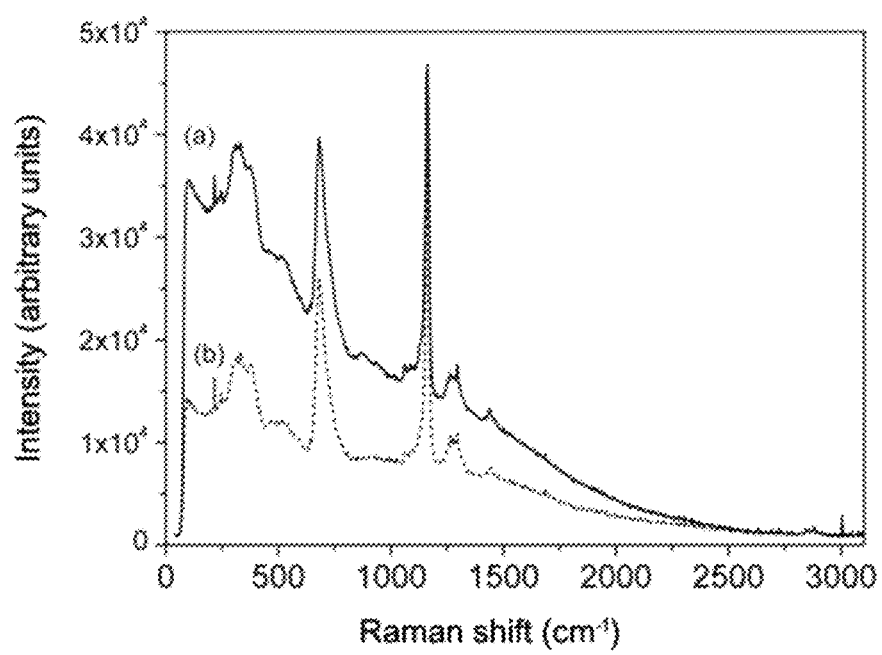
FIG. 1 shows the Raman spectra obtained for (a) activated and ground sodium hexametaphosphate frit particles (continuous line) and for (b) ground sodium hexametaphosphate salt (discontinuous line).

The structure of the samples was studied by means of Raman spectroscopy by means of BWTEK 785S i-Raman equipment with a 785 nm laser. FIG. 1 shows the Raman spectra obtained for (a) activated and ground sodium hexametaphosphate frit particles (continuous line) and for (b) ground sodium hexametaphosphate salt (discontinuous line). The main Raman modes characteristic of the sodium hexametaphosphate structure were present in the two samples as follows: vibrational modes of the symmetric stretching of the oxygen bridge between P—O—P tetrahedrons located at about 683 $cm^{-1}$, symmetric stretching of the terminal oxygen atoms in the $PO_2$ units that are doubly connected forming Q2-type tetrahedral chains at about 1163 $cm^{-1}$, and symmetric stretching of the P=OR terminal oxygen atoms found in Q3-type, three-dimensional, tetrahedral nets located at about 1280 $cm^{-1}$. Vibrational modes below 400 $cm^{-1}$ correspond to tetrahedral chain net bending modes.

Figure 2:
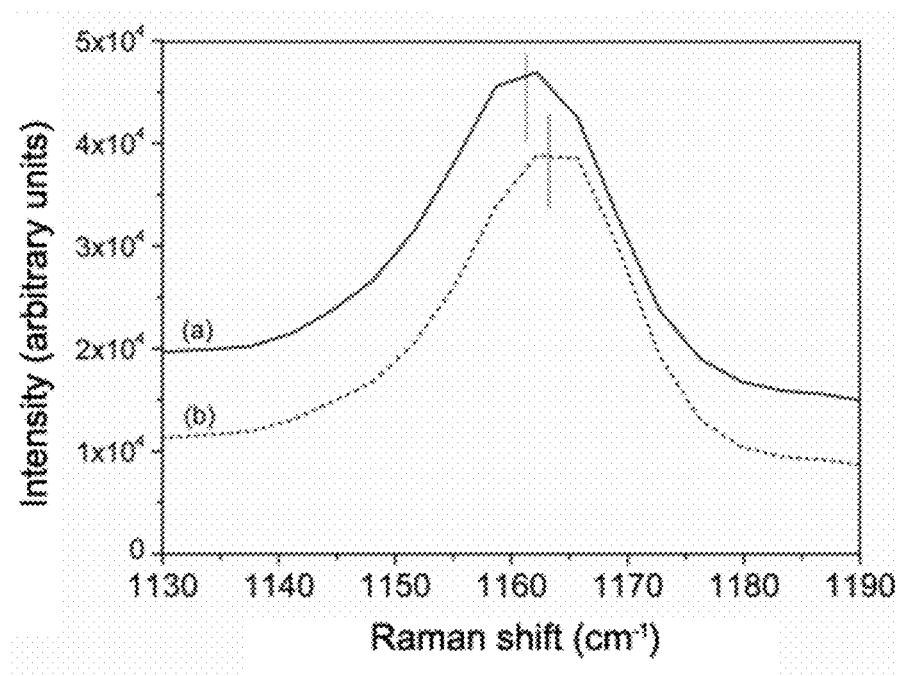
FIG. 2 shows an enlargement of the Raman spectra obtained for (a) activated and ground sodium hexametaphosphate frit particles (continuous line) and for (b) ground sodium hexametaphosphate salt (discontinuous line).

FIG. 2 shows a sample enlargement of the Raman spectra obtained for (a) activated and ground sodium hexametaphosphate frit particles (continuous line) and for (b) ground sodium hexametaphosphate salt (discontinuous line). Structurally, the main difference between ground sodium hexametaphosphate salt and activated and ground sodium hexametaphosphate frit particles consisted of a smaller red shift of the Raman mode corresponding to the symmetric stretching of the terminal oxygen atoms in the $PO_2$ units formed by Q2-type tetrahedral chains which decreases from a ground salt Raman shift value of 1163 $cm^{-1}$ to a ground frit value of 1161.5 $cm^{-1}$ (FIG. 2). This lower Raman shift value for the activated and ground sodium hexametaphosphate frit particles is associated with a smaller force constant of said bond or with a longer bond length. Therefore, the Q2 tetrahedral net in the ground frit has a more open net in comparison to the starting material of the sodium hexametaphosphate salt.

Comparative Example 4: Water Absorption Capacity of the Activated and Ground Sodium Hexametaphosphate Frit Particles and the Ground Sodium Hexametaphosphate Salt For comparison purposes, the water absorption capacity of the following components was evaluated: the starting sodium hexametaphosphate salt, starting the ground sodium hexametaphosphate salt, the activated sodium hexametaphosphate frit particles, and the activated and ground sodium hexametaphosphate frit particles of Example 3.

The samples were exposed to environmental humidity of 40-45% for 48 hours and the water absorption capacity was studied by means of thermogravimetric curves recorded in TA Instruments TGA Q50 equipment.

Figure 3:
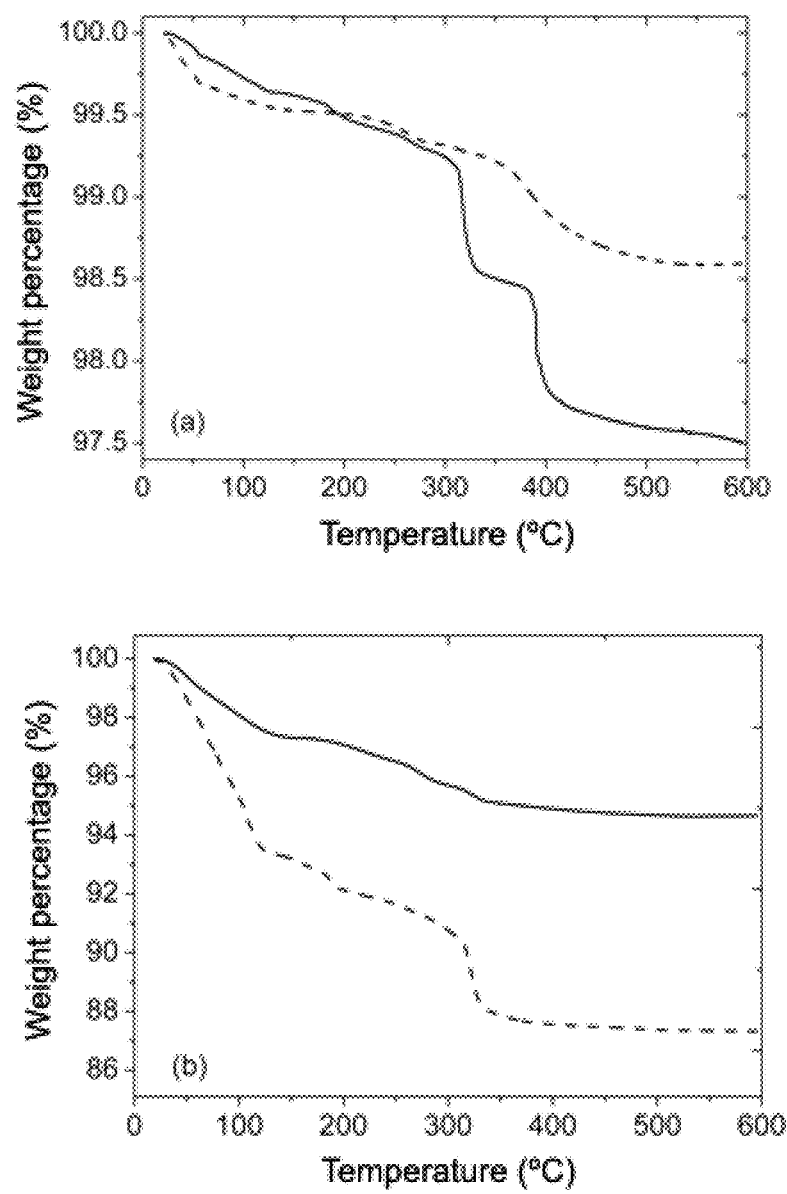
FIG. 3 shows the thermogravimetric curves corresponding to sodium hexametaphosphate salt (continuous line, FIG. 3a), ground sodium hexametaphosphate salt (discontinuous line, FIG. 3a), activated sodium hexametaphosphate frit particles (continuous line, FIG. 3b), and the activated and ground sodium hexametaphosphate frit particles (discontinuous line, FIG. 3b).

FIG. 3 depicts the comparative thermogravimetric curves corresponding to the starting sodium hexametaphosphate salt (continuous line, FIG. 3a), the ground sodium hexametaphosphate salt (discontinuous line, FIG. 3a), the activated sodium hexametaphosphate frit particles (continuous line, FIG. 3b), and the activated and ground sodium hexametaphosphate frit particles (discontinuous line, FIG. 3b). The main differences that were observed between the samples consisted of the % of weight loss and the temperatures at which said weight losses take place. The starting sodium hexametaphosphate salt experienced a mass loss of 2.5% by weight at 600° C., whereas said loss was 5.3% by weight for the activated sodium hexametaphosphate frit particles and 12.8% by weight for the activated and ground sodium hexametaphosphate frit particles.

Comparative Example 5: Rate of Dissolution of the Activated and Ground Sodium Hexametaphosphate Frit Particles and the Ground Sodium Hexametaphosphate Salt Particles For comparison purposes, the rate of dissolution of the ground sodium hexametaphosphate salt and the activated and ground sodium hexametaphosphate frit particles of Example 3 with an average d50 and d90 size of 8.5 and 44.3 μm was evaluated. To that end, conductivity variation in a suspension of 0.5 grams of the product to be evaluated in 50 ml of deionized water, the conductivity value of which is 12.6 μS/cm, was determined.

Figure 4:
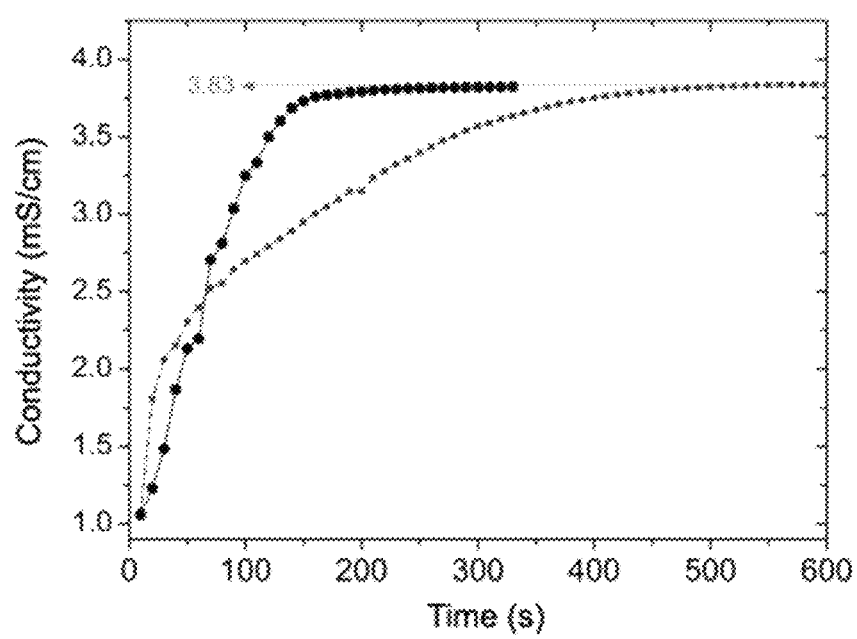
FIG. 4 shows conductivity values (mS/cm) with respect to time for ground sodium hexametaphosphate salt (square symbol) and for activated and ground sodium hexametaphosphate frit particles (circular symbol).

FIG. 4 shows the conductivity values (mS/cm) with respect to time for the ground sodium hexametaphosphate salt (square symbol) and for the activated and ground sodium hexametaphosphate frit particles (round symbol). Although the maximum conductivity reached in both cases was the same at 3.83 mS/cm (FIG. 4), in the frit particles this value was reached at 200 seconds, whereas the salt requires a longer time to reach said value, about 450 seconds. The values obtained for the activated and ground sodium hexametaphosphate frit particles with a particle size characterized by a d50 of 4.2 μm and a d90 of 8.3 μm of Example 2 were similar to those of the activated and ground particles with an average d50 and d90 size of 8.5 and 44.3 μm. Therefore, the activated and ground sodium hexametaphosphate frit particles have a higher rate of dissolution than the initial ground sodium hexametaphosphate salt.

Example 6: Encapsulating the Activated and Ground Sodium Hexametaphosphate Frit Particles in a Polymer Matrix to Yield a Composite Material The activated and ground sodium hexametaphosphate frit particles with a particle size characterized by a d50 of 4.2 μm and a d90 of 8.3 μm of Example 2 were incorporated in a low density polyethylene, LDPE.

First, the particles were incorporated in a LDPE polymer pellet generating a concentrated product or masterbatch. To that end, the activated sodium hexametaphosphate frit particles were dried at a temperature between 80 and 160° C. The activated and ground sodium hexametaphosphate frit particles were then incorporated in the polymer in a weight percentage of 20% by means of polymer mixing, melting, and extrusion processes. In a first step, the polymer was melted or heated to a viscoelastic state, mixed with the activated and ground sodium hexametaphosphate frit particles. The polymer that is melted (or in viscoelastic state) was then forced through a die, also referred to as a head, by means of the thrust generated by the rotary action of a concentrically-rotating screw, and it is passed through a mold in charge of rendering it the desired shape in a double-screw extruder in a temperature range between 160 and 205° C., the masterbatch or concentrated material of activated and ground sodium hexametaphosphate frit particles encapsulated in a polymer matrix being obtained.

By means of adding the LDPE pellet to the concentrated product or masterbatch described above and by means of a new mixing, melting, and extrusion method, a composite material with a mass percentage of activated and ground sodium hexametaphosphate frit particles embedded in the polymer film of 2% and a thickness of 80±4 μm was obtained. Said composite material has a uniform appearance and a high transparency as a result of the refractive index values of the frit particles of 1.48 and of the LDPE of 1.51. The percentage of activated and ground sodium hexametaphosphate frit particles which are incorporated in the LDPE polymer matrix was changed from 0.1 to 5% by mass, similar results being observed.

The same process for obtaining a concentrated composite material and for obtaining a composite material with concentrations of activated and ground sodium hexametaphosphate frit particles from 0.1% to 5% by weight was repeated using polypropylene (PP). Furthermore, the process was also repeated to obtain the corresponding composite materials from hexametaphosphate salt particles.

Figure 5:
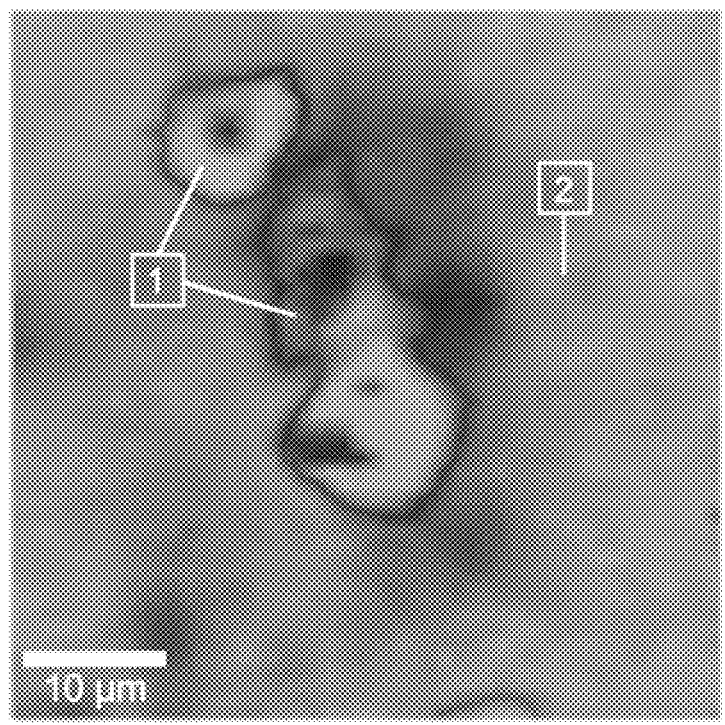
FIG. 5 shows the confocal microscopy image of an activated and ground sodium hexametaphosphate frit particle (1) embedded in a low density polyethylene (2).

Example 7: Characterizing the Activated and Ground Sodium Hexametaphosphate Frit Particles Encapsulated in a Polymer Matrix The composite material described in Example 6 with 2% of activated and ground sodium hexametaphosphate frit particles was characterized by means of Raman confocal microscopy (WITEC Alfa 500). FIG. 5 shows a Raman image in which each pixel of the image corresponds with a Raman spectrum. The activated and ground sodium hexametaphosphate frit particles are embedded in an isolated manner (with contour and a darker color and indicated with (1)) isolated in the continuous LDPE polymer matrix (with a lighter color and indicated with (2)). FIG. 5 shows the activated and ground frit particles which are inside the LDPE film with particle size values below 15 micron.

Figure 6:
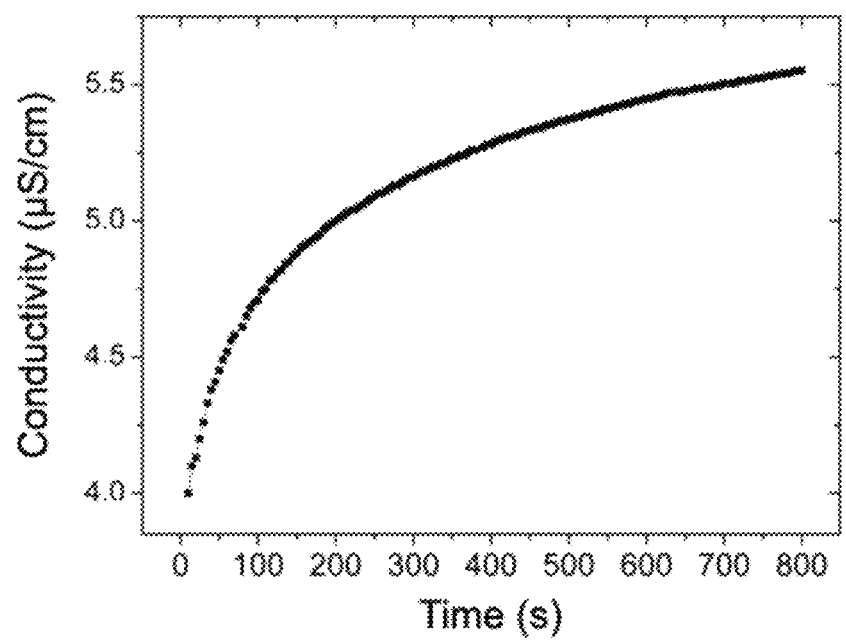
FIG. 6 shows conductivity values (μS/cm) with respect to time for activated and ground sodium hexametaphosphate frit particles embedded in a low density polyethylene.

Example 8: Rate of Dissolution of the Activated and Ground Sodium Hexametaphosphate Frit Particles Encapsulated in a Polymer Matrix The rate of dissolution of the activated and ground sodium hexametaphosphate frit particles encapsulated in a LDPE polymer matrix of Example 6 was evaluated. The conductivity variation of 0.056 g of a composite material film containing 2% by weight of activated and ground sodium hexametaphosphate frit to be evaluated in 100 ml of deionized water, the conductivity value of which is 3.3 $\mu S \cdot cm^{-1}$, was determined. FIG. 6 shows the conductivity values (μS/cm) with respect to time for the activated and ground sodium hexametaphosphate frit particles embedded in a low density polyethylene. The composite material reached a conductivity of 5.5 $\mu S \cdot cm^{-1}$ at about 900 seconds given that the water conductivity was 3.3 $\mu S \cdot cm^{-1}$, the activated sodium hexametaphosphate frit particles encapsulated in the polymer provided 2.2 $\mu S \cdot cm^{-1}$ to the water conductivity. The normalized conductivity value given per unit of gram of salt and per milliliter of water after 15 minutes would correspond to 0.196 mS·cm$^{-1}$·g·ml$^{-1}$ which is a value substantially lower than the values reached by the "free" activated and ground sodium hexametaphosphate frit particles at that same time in Example 5 corresponding to 0.766 mS·cm$^{-1}$·g·ml$^{-1}$. The dissolution of the activated and ground sodium hexametaphosphate frit particles embedded in a polymer in an aqueous solution thereby decreases significantly, so the time the inorganic particles are available in the polymer matrix increases.

Example 9: Characterizing the Surface of the Composite Material Comprising Activated and Ground Sodium Hexametaphosphate Frit Particles Encapsulated in a Polymer Matrix The surface of a film formed by the composite material comprising activated and ground sodium hexametaphosphate frit particles encapsulated in a polymer matrix according to Example 6 was characterized.

Said film was immersed in water for at least 15 minutes. It was then extracted, dried in an oven at 60° C. for 1 hour, and observed again by means of Raman confocal microscopy. FIG. 7a shows an optical confocal image in which there is observed on the surface of the polymer (2) the presence of small liquid droplets (3) found in the proximity of the frit particles (4). In other words, said areas of the surface of the composite material close to an activated sodium hexametaphosphate frit particle act as hydrophilic areas and the rest of the surface acts as hydrophobic areas.

FIG. 7b shows the Raman spectra characteristic of the main elements (4), (3), and (2) shown in FIG. 7a. A Raman spectroscopy analysis of the nature of the spherical liquid droplets (3) confirmed that said droplets contain water due to the presence of a Raman band located in the 3000-3500 cm$^{-1}$ region and sodium hexametaphosphate structural units similar to those present in the activated and ground sodium hexametaphosphate frit particles dispersed and encapsulated (4) in the polymer film (2). The liquid droplets are therefore stabilized by the presence of sodium hexametaphosphate structural units, particularly by the presence of an oxygen bridge between the P—O-tetrahedrons that are shifted considerably to blue and of the symmetric stretching modes of the terminal oxygen atoms in the PO$_2$ units that are shifted to red. Said structural modifications are indicative of the presence of depolymerized phosphorus tetrahedral units. Likewise, the Raman spectra demonstrated that the activated and ground sodium hexametaphosphate frit particles encapsulated in the polymer matrix (4) have water inside the polymer film after the immersion thereof in water. After the immersion thereof in water, the active, ground frit particles dispersed inside the polymer experience, to a lesser extent, a depolymerization process. The presence of droplets containing water and depolymerized tetrahedral units allow for the coexistence of polymer regions with hydrophobic characteristics along with hydrophilic regions related to the presence of activated and ground sodium hexametaphosphate frit particles incorporated in the polymer matrix.

FIG. 8 shows the surface of the polymer film formed by the composite material comprising activated and ground sodium hexametaphosphate frit particles encapsulated in a polymer matrix according to Example 6. Said film was exposed to environmental humidity for 60 days and observed by means of scanning electron microscopy (FE-SEM Hitachi S-4700). The film was observed after drying in an oven at 60° C. for 1 hour and after depositing a gold layer<100 nm on the surface thereof. The film shows the presence of multiple liquid droplets distributed on the surface of the polymer film (FIG. 8b). The distances between adjacent liquid droplets observed on the surface of the composite material are less than 10 μm, with there being regions where the distance between droplets is even less than 1 μm. These droplets are generated as a result of the existence of vacuum in the observation chamber of the electron microscope and indicate the positions of the ground frit particles dispersed in the polymer matrix. This arrangement of hydrophilic regions on a hydrophobic surface represents an unexpected aspect of the encapsulation of the ground frit particles of the present invention. These surfaces are characteristic of anti-fouling surfaces that are usually designed from hydrophobic and hydrophilic polymer mixtures.

Example 10: Antimicrobial Assay of the Surface of the Composite Material Comprising Activated and Ground Sodium Hexametaphosphate Frit Particles Encapsulated in a Polymer Matrix Antibacterial assays were performed based on ISO 22196: 2011 standard. Measurement of antibacterial activity on plastics and other non-porous surfaces.

Antimicrobial assays were performed on 8 samples consisting of a colorless and translucent polymer sheet. Two types of polymers, i.e., low density polyethylene (LDPE) and polypropylene (PP), were studied. Four samples were assayed for each polymer: a polymer sheet, a polymer sheet incorporating 1% by weight of hexametaphosphate salt, a polymer sheet incorporating 0.5% by weight of activated and ground sodium hexametaphosphate frit microparticles, and a polymer sheet incorporating 1% by weight of activated and ground sodium hexametaphosphate frit microparticles. In both cases, the films made of plastic material were cut into pieces measuring 5×5 cm before performing the assay.

The following microorganisms were used to perform the assay:
Gram-positive bacteria: *Staphylococcus aureus* and *Listeria innocua*; and
Gram-negative bacterium: *Escherichia coli*

The test microorganisms were pre-incubated and cultured according to the requirements of ISO 22196. After reconstitution, an inoculum at a concentration of 106 cfu/ml was prepared for each of the microorganisms.

The samples (polymer sheets) were placed in sterile plates and each of them was inoculated with aliquots of the suspension prepared from the test microorganism used in each case, according to the size of the surface, as indicated in ISO 22196. Then, a sterile plastic film was deposited on each aliquot such that a thin layer of the suspension was generated below the film and in contact with the antibacterial surface of the sample. After inoculation, microorganism count was performed on 3 samples to determine the amount of recovered microorganisms before incubation. To that end, the inoculated samples were introduced in a Stomacher® bag to which 10 ml of culture broth (agar with lecithin, polysorbate SCDLP) was added. The sample and the film were then washed such that the microorganisms present therein are recovered in the broth. With the resulting solution, the microorganisms in the plate count agar (PCA) culture medium were counted at an incubation temperature of 35±1° C. for 48 hours.

After inoculating the rest of the samples, they were incubated for 24±1 h at 35±1°° C. and at a minimum relative humidity of 90%. After the incubation period, and following the previously indicated method, counting of the samples was performed to determine the antibacterial activity value of the test materials.

Based on the obtained results, the antibacterial activity which will be expressed by means of the bacterial population reduction (R) value defined as follows was calculated:

$$R = Ut - At$$

where:
- R: bacterial population reduction (R) or bacterial activity reduction or log reduction;
- Ut: log mean of the count of bacteria in control samples (without antimicrobial treatment) after 24 h of incubation; and
- At: log mean of the count of bacteria in the samples with antimicrobial treatment after 24 h of incubation.

The number expressed as bacterial population reduction (R) value is the log-based capacity for eliminating bacteria which are in contact with the surface treated with the antibacterial agent within a time of 24 hours. The higher the factor R is, the greater the capacity of the treated material for eliminating the test microorganisms.

The assays were repeated in cultures kept under incubation conditions for one month.

TABLE 1

Results of the antimicrobial assays

| | R | | | | | |
|---|---|---|---|---|---|---|
| | S. Aureus | | L. Innocua | | E. Coli | |
| Composition | t = 24 h | t = 1 month | t = 24 h | t = 1 month | t = 24 h | t = 1 month |
| Control LDPE | 0 | 0 | 0 | 0 | 0 | 0 |
| LDPE + 1% salt | 0 | 0 | 0 | 0 | 0 | 0 |
| LDPE + 0.5% frit | 4.08 | 3.27 | 4.44 | 2.7 | 4.10 | 5.62 |
| LDPE + 1% frit | 2.34 | 4.65 | 4.44 | 4.57 | 4.72 | 5.62 |
| Control PP | 0 | 0 | 0 | 0 | 0 | 0 |
| PP + 1% salt | 0 | 0 | 0 | 0 | 0 | 0 |
| PP + 0.5% frit | 4.02 | 5.33 | 4.17 | 3.29 | 5.74 | 4.32 |
| PP + 1% frit | 4.02 | 4.17 | 4.17 | 3.29 | 5.74 | 5.29 |

The R values correspond with an effective microbial product for both types of Gram-positive and Gram-negative bacteria. Table 1 shows the results of the antimicrobial assays performed on the different samples under study. It should be pointed out that, while the control samples and the samples of a polymer material comprising the initial sodium hexametaphosphate salt did not yield any R value, the samples of a composite material comprising activated and ground sodium hexametaphosphate frit particles encapsulated in a polymer matrix yielded R values greater than 2, and R values>3 are recorded in most assays. Therefore, Table 1 demonstrates the antimicrobial effect of activated and ground sodium hexametaphosphate frit particles encapsulated in a polymer matrix.

Furthermore, the R values over 24 hours in time for the composite materials comprising 0.5 to 1% by mass of activated and ground frit particles should be highlighted.

Example 11: Antimicrobial Assay of the Surface of the Composite Material Comprising Activated and Ground Sodium Hexametaphosphate Frit Particles Encapsulated in a Polymer Matrix The antimicrobial capacity of a polymer sheet made of the composite material comprising activated and ground sodium hexametaphosphate frit particles encapsulated in a polymer matrix was studied. To that end, the developed Clean-Trace™ surface total ATP technique for evaluating microorganism load with an ATP marker was used.

A Gram-negative bacterium, Proteus mirabilis, was used to perform the assay. Said bacterium was diluted in water in a proportion of 1/100, forming an initial load of 4365 RLU (relative light units). After 24 h, the bacterial load in said aqueous solution was measured, with an RLU of 1995 being obtained (Table 2).

The samples evaluated as polymer sheets are the composite material comprising activated and ground sodium hexametaphosphate frit particles encapsulated in a LDPE polymer matrix with a load of 1% by weight of frit particles in comparison to the same product without particles. Furthermore, in the same assay, an LDPE polymer sheet comprising a load of 1.6% by weight of a soluble silver antimicrobial glass was also evaluated. All the samples had the same size, mass, and thickness.

The results were compiled in RLU (relative light units), determining the presence of bacteria in water, by means of ATP, which is an energy measurement and indicates the presence of bacteria.

TABLE 2

Antimicrobial assays by means of an ATP marker

| Sample | RLU (24 hours) |
|---|---|
| Standard water | 1995 |
| Present invention: LDPE with 1% frit | 158 |
| LPDE sheet without additive | 617 |
| Comparative material: LDPE with 1.6% by weight of antimicrobial glass containing Ag+, obtained by means of extrusion | 299 |

Table 2 shows the results of the antimicrobial assays performed on the different samples under study. The performed assays demonstrated that the antimicrobial capacity studied by means of the ATP test shows a greater reduction of relative light units for a composite material comprising activated and ground sodium hexametaphosphate frit particles encapsulated in a polymer matrix than for a composite material comprising a standard antimicrobial additive based on glass comprising positive silver ions ($Ag^+$).

Having sufficiently described the nature of the present invention as well as at least one way of putting it into practice, it only remains to be said that changes in terms of form, materials, and arrangement can be introduced in the present invention as a whole and in parts making up same provided that said alterations do not substantially change said invention.

The invention claimed is:

1. A composite material comprising:
   a) activated and ground sodium hexametaphosphate frit particles obtainable by means of a thermal activation method comprising the steps of:

i) heating a sodium hexametaphosphate salt until it melts such that a molten sodium hexametaphosphate salt is obtained;
ii) abruptly cooling the molten sodium hexametaphosphate salt obtained in step (i) in a dry medium to obtain activated sodium hexametaphosphate frit particles; and
iii) grinding the activated sodium hexametaphosphate frit particles obtained in step (ii) to obtain activated and ground sodium hexametaphosphate frit particles; and b) a polymer matrix;

wherein said composite material comprises the activated and ground sodium hexametaphosphate frit particles in a mass percentage less than 60%; and wherein said activated and ground sodium hexametaphosphate frit particles are embedded in said polymer matrix.

2. The composite material according to claim 1, wherein in step (ii) the temperature is reduced from the salt melting temperature to a temperature below 500° C. in less than one minute.

3. The composite material according to claim 1, wherein the activated and ground sodium hexametaphosphate frit particles have a d90 parameter below 10 micron.

4. The composite material according to claim 1, wherein the activated and ground sodium hexametaphosphate frit particles comprise a mass percentage of absorbed water greater than 2.5%.

5. The composite material according to claim 1, wherein the activated and ground sodium hexametaphosphate frit particles have refractive index values comprised between 1.4 and 1.6.

6. The composite material according to claim 1, wherein said composite material comprises the activated and ground sodium hexametaphosphate frit particles in a mass percentage comprised between 0.1 and 5%.

7. The composite material according to claim 1, wherein the polymer matrix is hydrophobic.

8. The composite material according to claim 1, wherein the polymer matrix comprises at least one thermosetting polymer, at least one thermoplastic polymer, or combinations thereof.

9. The composite material according to claim 1, comprising normalized conductivity values of less than 0.700 $mS \cdot cm^{-1} \cdot g \cdot ml^{-1}$ per gram of frit particles and milliliters of water of activated and ground sodium hexametaphosphate frit particles after 15 minutes in an aqueous solution.

10. The composite material according to claim 1, comprising hydrophobic and hydrophilic areas on the surface thereof.

11. The composite material according to claim 1, comprising at least one antimicrobial additive.

12. The composite material according to claim 11, wherein said at least one antimicrobial additive is selected from silver derivatives, copper derivatives, zinc derivatives, phenolic biocides, quaternary ammonium compounds, titanium oxides, fungicides, antimicrobial glass, and combinations thereof.

13. A method for obtaining the composite material defined in claim 1, comprising the steps of:
i) providing
a) activated and ground sodium hexametaphosphate frit particles obtainable by means of a thermal activation method comprising the steps of:
i) heating a sodium hexametaphosphate salt until it melts such that a molten sodium hexametaphosphate salt is obtained;
ii) abruptly cooling the molten sodium hexametaphosphate salt obtained in step (i) in a dry medium to obtain activated sodium hexametaphosphate frit particles; and
iii) grinding the activated sodium hexametaphosphate frit particles obtained in step (ii) to obtain activated and ground sodium hexametaphosphate frit particles; and
b) a polymer matrix; and
ii) embedding said activated and ground sodium hexametaphosphate frit particles in said polymer matrix,
wherein said composite material comprises the activated and ground sodium hexametaphosphate frit particles in a mass percentage less than 60%.

14. The method for obtaining the composite material according to claim 13, wherein in step (ii) the temperature is reduced from the salt melting temperature to a temperature below 500° C. in less than one minute.

15. The composite material according to claim 12, wherein the fungicide comprising thiabendazole.

16. A composite material comprising:
a) activated and ground sodium hexametaphosphate frit particles obtainable by means of a thermal activation method comprising the steps of:
i) heating a sodium hexametaphosphate salt until it melts such that a molten sodium hexametaphosphate salt is obtained;
ii) abruptly cooling the molten sodium hexametaphosphate salt obtained in step (i) in a dry medium to obtain activated sodium hexametaphosphate frit particles; and
iii) grinding the activated sodium hexametaphosphate frit particles obtained in step (ii) to obtain activated and ground sodium hexametaphosphate frit particles; and
c) a polymer matrix;

wherein said composite material comprises the activated and ground sodium hexametaphosphate frit particles in a mass percentage comprised between 0.1 and 5%; and wherein said activated and ground sodium hexametaphosphate frit particles are embedded in said polymer matrix.

* * * * *